United States Patent
Jovanovic et al.

(10) Patent No.: US 11,675,656 B2
(45) Date of Patent: *Jun. 13, 2023

(54) ERROR DETECTION CODE GENERATION TECHNIQUES

(71) Applicant: Micron Technology, Inc., Boise, ID (US)

(72) Inventors: Natalija Jovanovic, Munich (DE); Stefan Dietrich, Türkenfeld (DE)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,766

(22) Filed: Feb. 18, 2022

(65) Prior Publication Data

US 2022/0171673 A1 Jun. 2, 2022

Related U.S. Application Data

(63) Continuation of application No. 17/170,462, filed on Feb. 8, 2021, now Pat. No. 11,281,529.

(Continued)

(51) Int. Cl.
*G06F 11/00* (2006.01)
*G06F 11/10* (2006.01)

(52) U.S. Cl.
CPC ................ *G06F 11/1004* (2013.01)

(58) Field of Classification Search
None
See application file for complete search history.

(56) References Cited

U.S. PATENT DOCUMENTS

| 2004/0088636 A1* | 5/2004 | Cypher | G06F 13/1668 |
| | | | 714/E11.049 |
| 2013/0166986 A1* | 6/2013 | Alrod | G06F 11/1048 |
| | | | 714/755 |

(Continued)

FOREIGN PATENT DOCUMENTS

| KR | 20140050152 A | 4/2014 |
| KR | 20180031555 A | 3/2018 |

OTHER PUBLICATIONS

S. Tambatkar, S. N. Menon, V. Sudarshan, M. Vinodhini and N. S. Murty, "Error detection and correction in semiconductor memories using 3D parity check code with hamming code," 2017 International Conference on Communication and Signal Processing (ICCSP), Chennai, India, 2017, pp. 0974-0978, (Year: 2017).*

(Continued)

*Primary Examiner* — Daniel F. McMahon
(74) *Attorney, Agent, or Firm* — Holland & Hart LLP

(57) ABSTRACT

Methods, systems, and devices related to error detection code generation techniques are described. A memory device may identify a first set of bits for transmission to a host device and calculate an error detection code associated with the first set of bits. Prior to transmitting the first set of bits, the memory device may modify one or more bits of the first set of bits to generate a second set of bits for transmission from the memory device to the host device. The memory device may modify one or more bits of the first error detection code to generate a second error detection code based on a parity of the modified one or more bits of the first set of bits. The memory device may transmit the second set of bits and the second error detection code to the host device.

20 Claims, 11 Drawing Sheets

Related U.S. Application Data

(60) Provisional application No. 62/977,043, filed on Feb. 14, 2020.

(56) References Cited

U.S. PATENT DOCUMENTS

| | | | |
|---|---|---|---|
| 2015/0280748 A1* | 10/2015 | Gendler | H03M 13/2906 |
| | | | 714/755 |
| 2017/0160946 A1 | 6/2017 | Kodera et al. | |
| 2018/0278267 A1* | 9/2018 | Lee | H03M 13/618 |
| 2019/0068270 A1 | 2/2019 | Schenk et al. | |
| 2019/0305888 A1* | 10/2019 | Das Sharma | H04L 1/0063 |
| 2020/0036477 A1 | 1/2020 | Xu et al. | |
| 2020/0210292 A1* | 7/2020 | Kim | H03M 13/152 |
| 2021/0255918 A1* | 8/2021 | Jovanovic | G06F 11/1004 |

OTHER PUBLICATIONS

ISA/KR, International Search Report and Written Opinion of the International Searching Authority, Int'l Appl. No. PCT/US2021/017171, May 28, 2021, Korean Intellectual Property Office, Seo-gu, Daejeon, Republic of Korea, 9pgs.

M.M.R. Khan and M.S. Sadi, "An Efficient Error Correction Coding Approach to Tolerate Soft Error," 2012 15th International Conference on Computer and Information Technology (ICCIT), 2012, pp. 500-505, doi: 10.1109/ICCITechn.2012.6509768. (Year: 2012).

\* cited by examiner

ERROR DETECTION CODE GENERATION TECHNIQUES

CROSS REFERENCE

The present application for patent is a continuation of U.S. patent application Ser. No. 17/170,462 by JOVANOVIC et al., entitled "ERROR DETECTION CODE GENERATION TECHNIQUES," filed Feb. 8, 2021, which claims the benefit of U.S. Provisional Patent Application No. 62/977,043 by JOVANOVIC et al., entitled "ERROR DETECTION CODE GENERATION TECHNIQUES," filed Feb. 14, 2020, each of which is assigned to the assignee hereof, and each of which is expressly incorporated by reference herein.

BACKGROUND

The following relates generally to one or more memory systems and more specifically to error detection code generation techniques.

Memory devices are widely used to store information in various electronic devices such as computers, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source. FeRAM may be able to achieve densities similar to volatile memory but may have non-volatile properties due to the use of a ferroelectric capacitor as a storage device.

DETAILED DESCRIPTION

Figure 1:
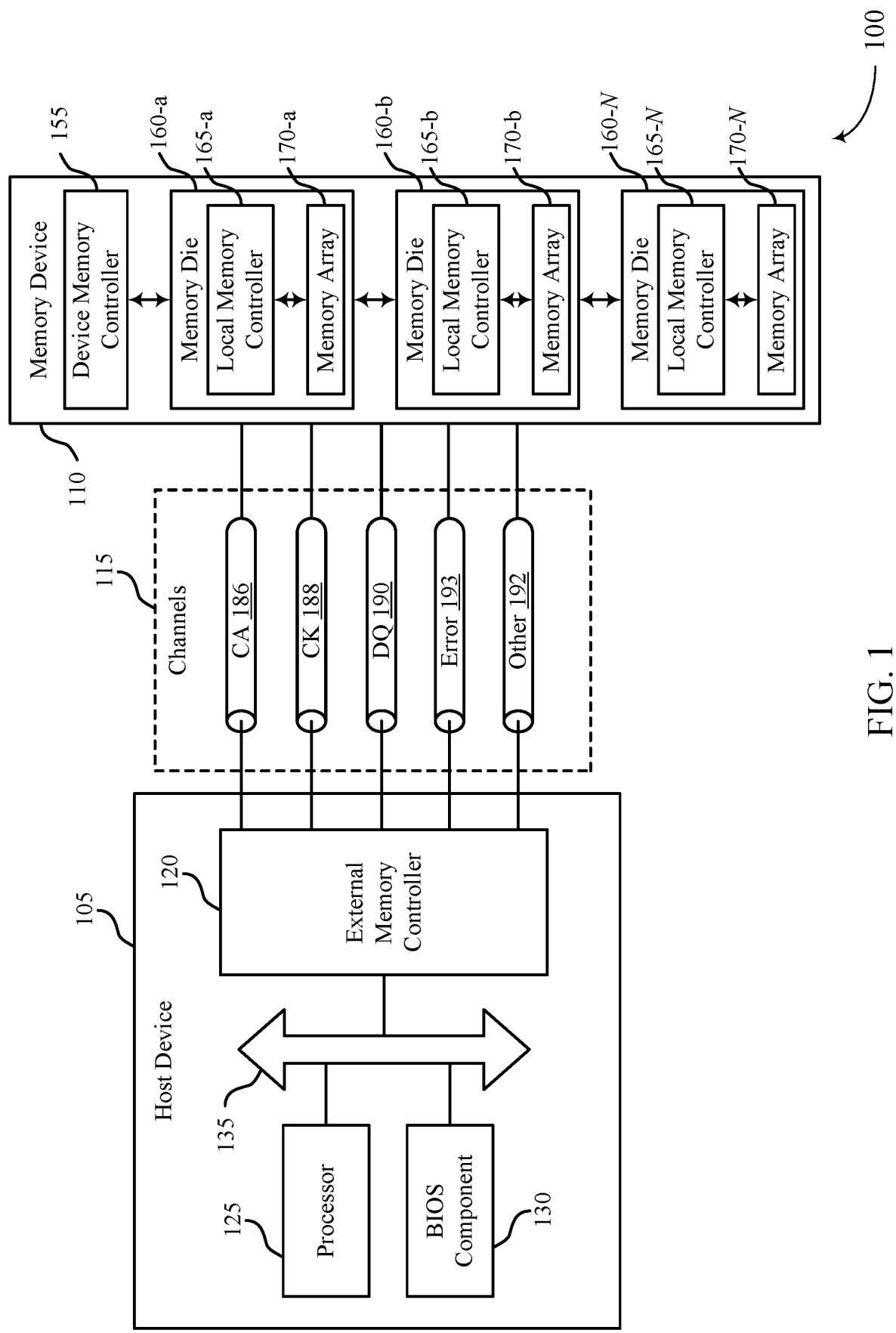
FIG. 1 illustrates an example of a system that supports error detection code generation techniques in accordance with examples as disclosed herein.

Improving memory devices may include increasing memory cell density, increasing read/write speeds, increasing reliability, increasing data retention, reducing power consumption, or reducing manufacturing costs, among other metrics.

A memory device may receive a command (e.g., from a host device) to perform an access operation (e.g., a read operation, a write operation, a refresh operation). The memory device may identify data (e.g., a first set of bits) for transmission to the host device in association with an execution of the access operation. The memory device may calculate an error detection code (e.g., a cyclic redundancy check (CRC)) associated with the first set of bits to transmit to the host device. Transmitting the error detection code (e.g., in addition to the data) may increase a reliability of the data transmission to the host device by enabling the host device to detect or correct errors within the data. In some cases, the memory device may apply a function to modify the first set of bits during the execution of the access operation. For example, the memory device may modify one or more bits of the first set of bits (e.g., to reduce power consumption, to increase a reliability of the transmission) prior to transmitting the bits to the host device. In some cases, the memory device may determine the function for modifying the data in parallel with or after identifying the first set of bits for transmission to the host device. As a result, the memory device may calculate the error detection code for the first set of bits and recalculate the error detection code for the modified data (e.g., the second set of bits). Performing two distinct error detection code calculations (e.g., for the first set of bits and for the second set of bits) may utilize additional area on the memory die, increase processing times, and cause additional latency in the device when compared to only calculating a single error detection code.

According to various aspects, the memory device may generate the second error detection code based on the first error detection code and without performing a distinct error detection code calculation using the second set of bits. In some cases, this may decrease an amount of time, area, and power utilized by the memory device to determine the second error detection code. The memory device may generate the second error detection code based on the first error detection code and a parity vector associated with the modified bits. That is, the memory device may determine a parity of the bits of the first set of bits that are modified during a generation of the second set of bits. Based on the determined parity, the memory device may modify one or more bits of the first error detection code to generate the second error detection code. Thus, the second error detection code may be determined without a distinct or complete recalculation of the error detection code based on the modified data. In some cases, the memory device may determine the parity of the bits that are modified during the generation of the second set of bits based on the function for modifying the data and independently of the modified second set of bits. Thus, the memory device may calculate the second error detection code in parallel to performing the data modification to generate the second set of bits.

Features of the disclosure are initially described in the context of memory systems and dies as described with reference to FIGS. 1-2. Features of the disclosure are described in the context of bit transmissions and an example of a data modification configuration as described with reference to FIGS. 3-6. These and other features of the disclosure are further illustrated by and described with reference to an apparatus diagram and flowcharts that relate to error detection code generation techniques as described with references to FIGS. 7-11.

FIG. 1 illustrates an example of a system 100 that supports error detection code generation techniques in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. The local memory controller 165 may be an example of circuitry operable to control one or more functions of the memory die 160. Additionally or alternatively, the local memory controller 165 may be an example of a processor of the memory device 110 that manages, e.g., in leiu of or in addition to an external memory controller (e.g., external memory controller 120 depicted and described with reference to FIG. 1), operation of the memory die 160 according to commands or instructions. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, processing units, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, the CA channel 186 may include a read command with an address of the desired data. In some examples, a CA channel 186 may include any number of signal paths to decode one or more of address or command data (e.g., eight or nine signal paths).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

In some examples, the error channels 193 may be operable to communicate error detection signals, such as checksums, to improve system reliability. An error channel 193 may include any quantity of signal paths.

The channels 115 may include any quantity of signal paths or pins (including a single signal path). In some examples, a channel 115 may include multiple individual signal paths. For example, a channel may be ×4 (e.g., including four signal paths), ×8 (e.g., including eight signal paths), ×16 (including sixteen signal paths), etc.

The host device 105 may communicate, by the CA channel 186, an access command (e.g., a read command) to the memory device 110. The access command may indicate a first set of bits stored within a memory array 170 of the memory device 110. Based on the access command, the memory device 110 may identify the first set of bits to transmit to the host device 105 by the DQ channel 190. The memory device 110 may calculate an error detection code and transmit the error detection code to the host device 105 by the error channel 193. In some cases, the memory device 110 may modify the data during an access operation by applying a modification function to the first set of bits. Here, the memory device 110 may transmit the modified data (e.g., a second set of bits) to the host device 105 by the DQ channel 190 instead of transmitting the first set of bits to the host device 105. Additionally, the memory device 110 may generate a second error detection code associated with the modified data and transmit the second error detection code (e.g., instead of the first error detection code) to the host device 105 by the error channel 193. The memory device 110 may generate the second error detection code by modifying the first error detection code and without recalculating an error detection code based on the modified data. The memory device 110 may modify the first error detection code based on parity of the bits (e.g., of the first set of bits) that are modified to generate that second set of bits. In some cases, the memory device 110 may determine the second error detection code in parallel to executing the modification function to generate the second set of bits.

Figure 2:
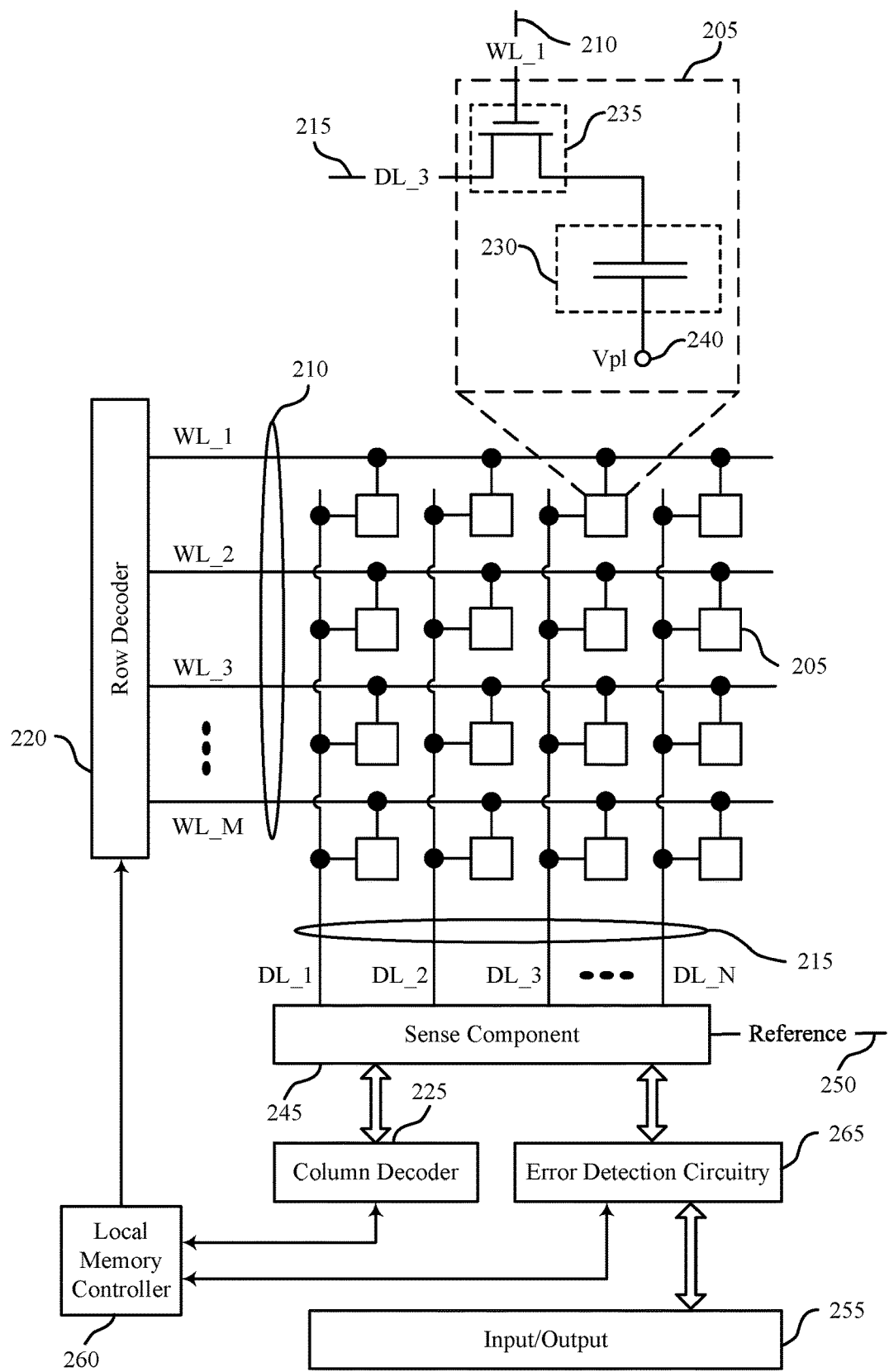
FIG. 2 illustrates an example of a memory die that supports error detection code generation techniques in accordance with examples as disclosed herein.

FIG. 2 illustrates an example of a memory die 200 that supports error detection code generation techniques in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., a programmed one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260, which may be logic or circuitry configured to perform discrete tasks, or in some cases, may be or include more sophisticated componentry that manages operation (in lieu of or in addition to) a controller on the host side of the interface (e.g., external memory controller 120 depicted and described with reference to FIG. 1). The local memory controller 260 may activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

The sense component 245 may be coupled with the error detection circuitry 265. The error detection circuitry 265 may be configured to generate error detection codes for data read from the memory die 200. For example, the sense component 245 may receive a first set of bits from the memory die and communicate the first set of bits to the error detection circuitry 265. The error detection circuitry 265 may generate a first error detection code associated with the first set of bits. The local memory controller 260 may also modify the first set of bits during an access operation (e.g., the local memory controller 260 may invert one or more bits of one or more individual data channels) and generate a second set of bits for transmission from the memory die 200 to the host device. In some examples, the error detection circuitry 265 may generate a second error detection code associated with the second set of bits using the first error detection code. For example, the error detection circuitry 265 may determine a function for generating a parity vector to be applied to the first error detection code based on the data modification function applied to the first set of bits by the local memory controller 260. The local memory controller 260 may then transmit the first error detection code and the second error detection code to the host device 105 as described with reference to FIG. 1.

Figure 3:
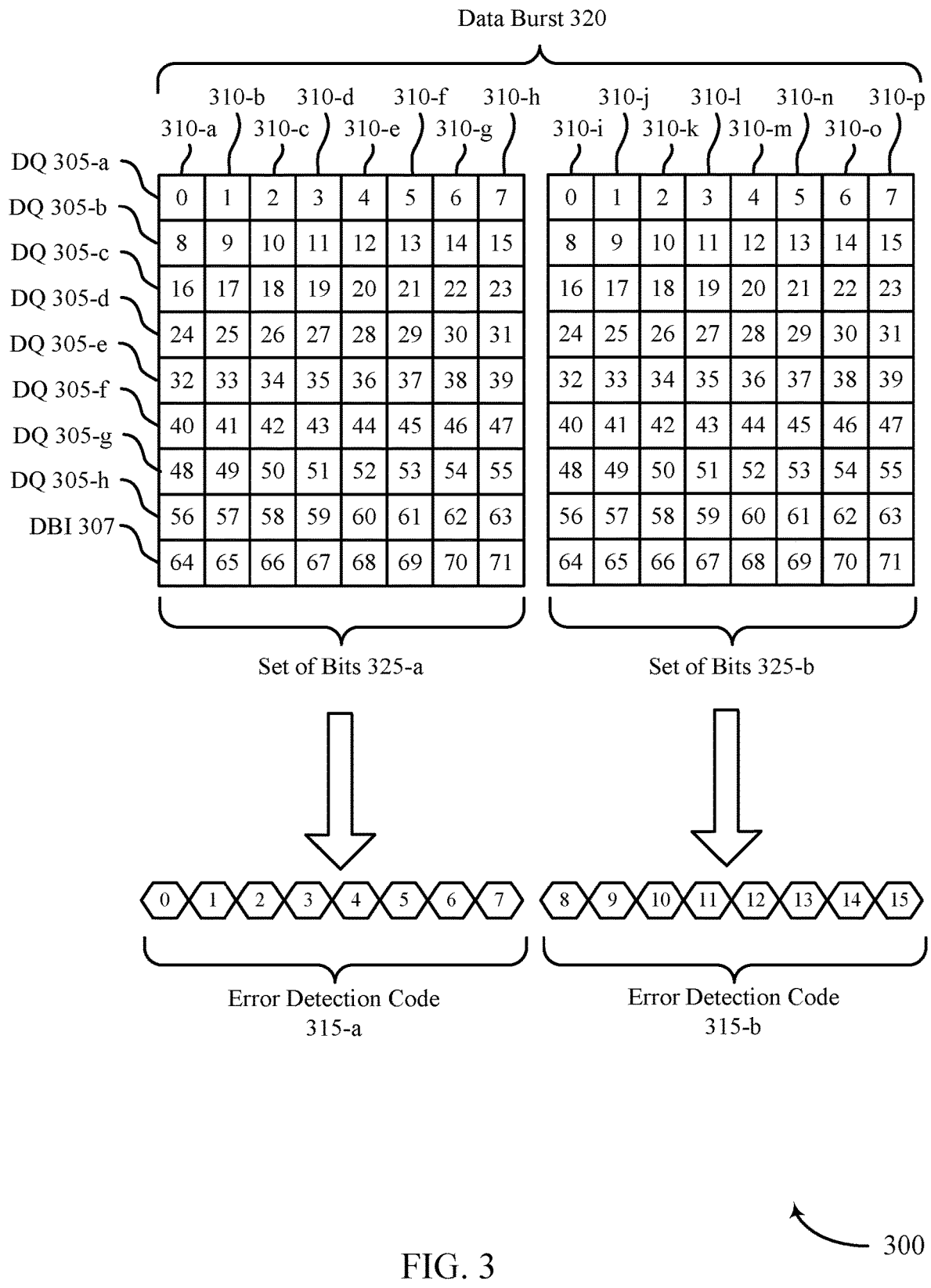
FIGS. 3 through 5 illustrate example bit transmissions that support error detection code generation techniques in accordance with examples as disclosed herein.

FIG. 3 illustrates a bit transmission 300 that supports error detection code generation techniques in accordance with examples as disclosed herein. The bit transmission 300 may be an example of bits transmitted by a memory device to a host device (e.g., as described with reference to FIGS. 1 and 2). The bit transmission 300 may include a transmission of two sets of bits 325 and a corresponding error detection codes 315 during a data burst 320. The memory device may transmit the sets of bits 325 to the host device by a data channel (e.g., as described with reference to FIG. 1) including DQ pins 305. The memory device may additionally calculate an error detection code 315 associated with each of the sets of bits 325. The memory device may transmit the error detection codes 315 to the host device by an error detection code channel as described with reference to FIG. 1.

When a memory device receives an access command (e.g., a read a command) from a host device, the memory device may identify one or more sets of bits 325 for transmission to the host device. For example, the read command may indicate an address within a memory array of the memory device (e.g., as described with reference to FIGS. 1 and 2). The memory device may execute the read command by reading the one or more memory cells indicated by the address within the read command. The identified sets of bits 325 may correspond to logic values stored by the memory cells indicated by the address within the read command. In one example, a read command may indicate both of the sets of bits 325-a and 325-b spanning a 16-bit data burst 320.

The memory device may calculate an error detection code (e.g., a CRC codeword) associated with each of the sets of bits 325. For example, error detection circuitry (e.g., as described with reference to FIG. 2) may calculate an error detection code 315-a for the set of bits 325-a and error detection code 315-b for the set of bits 325-b. The memory device may calculate the error detection codes 315 associated with a full data burst 320 in two halves. For example, the memory device may calculate an 8-bit error detection code 315-a based on the 72-bit set of bits 325-a. Additionally, the memory device may calculate an 8-bit error detection code 315-b based on the distinct 72-bit set of bits 325-b. Each bit of each error detection code 315 may be calculated based on a parity of a portion of bits of the associated set of bits 325, where the portion of bits may be determined by applying a polynomial to the set of bits 325. For example, the memory device may calculate bit 0 of the error detection code 315-a by determining a parity of a first portion of bits from the set of bits 325-a indicated by the polynomial. Additionally, the memory device may calculate bit 1 of the error detection code 315-a by determining a parity of a second portion of bits from the set of bits 325-a indicated by a different polynomial. Here, the first and second portions may include some of the same bits from the set of bits 325-a and some different bits from the set of bits 325-a (e.g., based on the polynomials).

In some cases, the memory device may modify the set of bits 325 during an execution of the access operation. For example, the memory device may apply a modification function to each of the sets of bits 325 to generate modified sets of bits 325. In some cases, the memory device may recalculate the error detection codes 315 by applying the polynomial to each of the sets of bits 325 and determining a parity of each portion of bits indicated by the polynomial. In some other cases, the memory device may modify the error detection codes 315 based on the modification function applied to each of the sets of bits 325 (e.g., instead of recalculating the error detection codes 315). Here, the memory device may modify the error detection codes based on a parity of the bits within each of the sets of bits 325 that are modified to generate the modified sets of bits 325. For example, the memory device may initially calculate bit 8 of the error detection code 315-b based on a parity of a portion of the bits within the set of bits 325-b, where the portion of the bits is indicated by the polynomial. The memory device may determine a parity of the bits within the portion of the bits that are modified to generate the modified data. If the parity of the bits within the portion of the bits that are modified to generate the modified data is even, the memory device may maintain a logic value of bit 8 of the error detection code 315-b. Alternatively, if the parity of the bits within the portion of the bits that are modified to generate the modified data is odd, the memory device may change a logic value of bit 8 of the error detection code 315-b.

The memory device may transmit the data burst 320 by a quantity (e.g., eight) DQ pins 305 and a data bus inversion (DBI) pin 307. The memory device may transmit a subset of the sets of bits 325 during discreet burst positions 310. For example, the memory device may transmit bits 0, 8, 16, 24, 32, 40, 48, 56, and 64 during a burst position 310-a and the memory device may transmit bits 1, 9, 17, 25, 33, 41, 49, 57, and 65 during a burst position 310-b. The DBI pin 307 may output data indicating whether the data transmitted within the corresponding burst positions 310 is inverted or not inverted. That is, a first logic value (e.g., a logic value '0' or logic value '1') transmitted by the DBI pin 307 may indicate that each of the bits within the same burst position 310 are not inverted while a different logic value transmitted by the DBI pin 307 may indicate that each of the bits within the same burst position 310 are inverted. For example, bit 64 of the set of bits 325-*a* output by the DBI pin 307 may be a logic value '1' to indicate that the data within the burst position 310-*a* is inverted. In another example, bit 71 of the set of bits 325-*b* output by the DBI pin 307 may be a logic value '0' to indicate that the data within the burst position 310-*n* is not inverted.

The memory device may transmit the error detection codes 315 by a second channel (e.g., an error channel as described with reference to FIG. 1). In some examples, the memory device may transmit the error detection codes 315-*a* according to a full data rate or across the entire data burst 320. Here, the memory device may transmit each of the bits of the error detection code 315-*a* during the first eight burst positions 310 (e.g., burst position 310-*a* through burst position 310-*h*) within the data burst 320 and each of the bits of the error detection code 315-*b* during the following eight burst positions 310 (e.g., burst position 310-*i* through burst position 310-*p*) within the data burst 320. In other examples, the memory device may transmit the error detection codes 315 according to a half data rate or across half of the data burst 320. Here, the memory device may reduce a quantity of error detection bits within the error detection code 315 by performing a logic function on the error detection codes 315-*a* and 315-*b*. For example, the memory device may generate a third error detection code by performing an exclusive OR (XOR) operation using the error detections code 315-*a* and the error detection code 315-*b*. Here, the memory device may transmit the third error detection code within eight bits of the 16-bit data burst 320.

The host device may receive the sets of bits 325 and the error detection codes 315 transmitted within the data burst 320. The host device may perform an error detection operation using the error detection codes 315 to detect or correct errors within the sets of bits 325.

Figure 4:
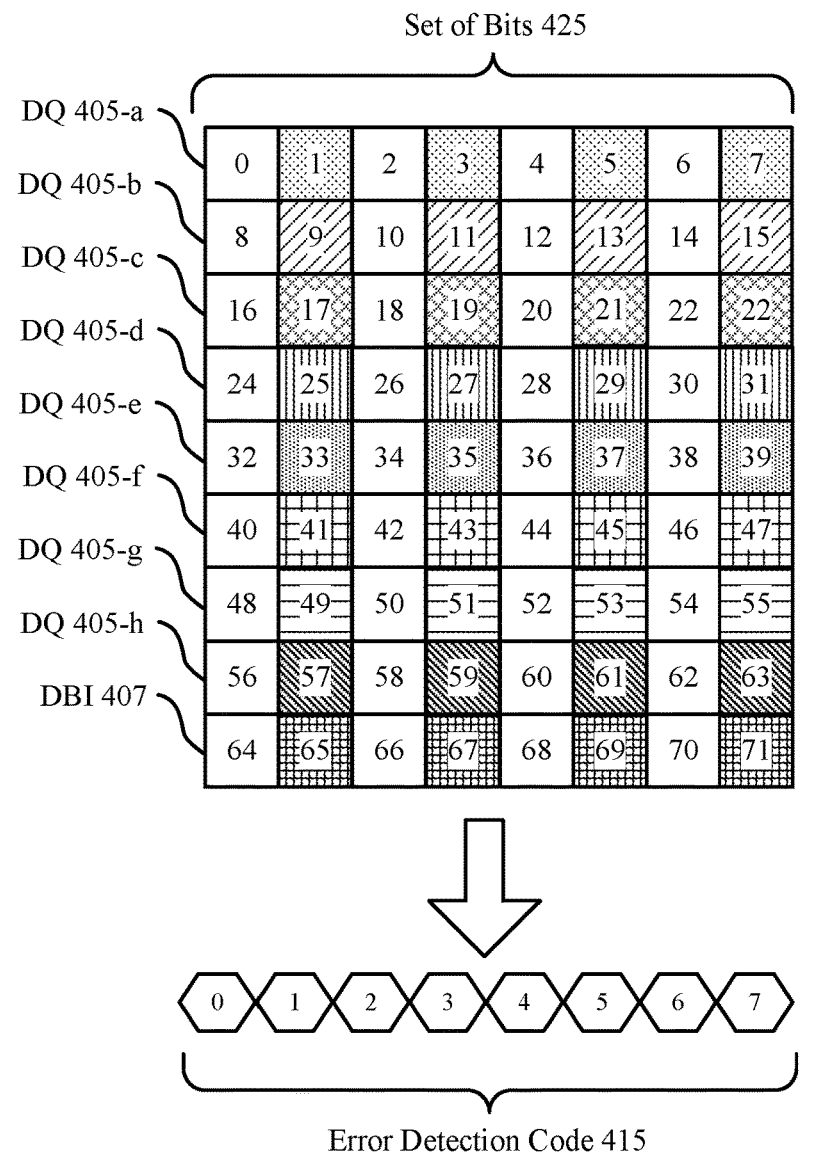

FIG. 4 illustrates a bit transmission 400 that supports error detection code generation techniques in accordance with examples as disclosed herein. The bit transmission 400 may illustrate bits transmitted from a memory device (e.g., the memory device 110, the memory die 200 described with reference to FIGS. 1 and 2) to a host device (e.g., the host device 105 as described with reference to FIG. 1). The bit transmission 400 may include aspects of bit transmission 300 as described with reference to FIG. 3. For example, the set of bits 425 may be an example of the set of bits 325, and the error detection code 415 may be an example of the error detection codes 315. The memory device may transmit the error detection codes 415 to the host device by an error detection code channel as described with reference to FIGS. 1 through 3.

As described with reference to FIGS. 1 through 3, the memory device may receive an access command from a host device and identify a first set of bits 425 based on the received access commands. For example, during the execution of a read command, the memory device may identify the bits 425 for transmission to the host device. Additionally, the memory device may calculate an error detection code 415 based on the identified set of bits 425. In some cases, each of the bits of the error detection code 415 may indicate a parity of a portion of the set of bits 425, where the portion of the set of bits associated with each bit of the error detection code 415 may be defined by a polynomial.

In some cases, the memory device may modify the set of bits 425 during an execution of the access operation. For example, the memory device may apply a modification function to the set of bits 425 to generate a modified set of bits 425. The modification function may be predefined or preconfigured. Additionally or alternatively, the modification function may be indicated to the memory device by the host device. In the example of bit transmission 400, the modification function may be based on inputs associated with the DQ pins 405 and the DBI pin 407. That is, the memory device may determine to apply a preconfigured modification function to each of the odd bits of the set of bits 425 based on inputs associated with each DQ pin 405 and an input associated with the DBI pin 407. In some other cases, the modification function may be applied to any quantity of bits (e.g., to the even bits within the set of bits 425, to all bits within the set of bits 425). Additionally, the modification function may be based on inputs other than or in addition to a DQ pin 405 input. For example, the modification function may be based on a burst position of the bit within the set of bits 425. Additionally, a portion of the bits within the set of bits 425 may be masked (e.g., based on DQ pin 405 or burst position).

Here, the modification function may dictate that each odd bit of the set of bits 425 may be inverted based on a flag or indicator bit associated with each DQ pin 405. For example, if a flag or indicator bit associated with DQ pin 405-*a* is a logic value '0', each odd bit associated with DQ pin 405-*a* may be inverted. For example, bits 1, 3, 5, and 7 may be inverted if the flag or indicator bit associated with DQ pin 405-*a* is a logic value '0'. In this example, the bits within the set of bits 425 (e.g., associated with a DQ pin 405) may be inverted based on a logic function (e.g., an exclusive not-OR (XNOR) logic function) applied to the bits associated with that DQ pin 405 using the flag or indicator. For example, each odd bit associated with DQ pin 405-*b* may be XNORed with the indicator bit or flag associated with DQ pin 405-*b*. Thus, if the flag or indicator is a logic value '0', the bits may be inverted. Additionally, if the flag or indicator is a logic value '1', the bits may not be inverted. In some cases, the indicator bit or flag associated with each DQ pin 405 may be preconfigured or known by the memory device. Additionally or alternatively, the indicator bit or flag associated with each DQ pin 405 may be indicated to the memory device dynamically (e.g., by the host device).

The memory device may modify the error detection code 415 (e.g., calculated on the set of bits 425 prior to applying the modification function) based on the modifications applied to the set of bits 425. The memory device may modify the error detection code 415 based on a parity of the bits within the set of bits 425 that are modified to generate the modified sets of bits 425. That is, each bit of the error detection code 415 may be calculated based on a parity of a predefined portion of the set of bits 425 (e.g., predefined by a polynomial). The memory device may determine, for each bit of the error detection code 415, a parity of bits within the predefined portion of the set of bits 425 that are to be inverted based on the modification function. If the parity of the bits within the portion of the set of bits 425 that are modified to generate the modified data is even, the memory device may maintain a logic value of the corresponding bit within the error detection code 415. Alternatively, if the parity of the bits within the portion of the bits that are modified to generate the modified data is odd, the memory device may invert a logic value of the corresponding bit within the error detection code 415.

Figure 5:
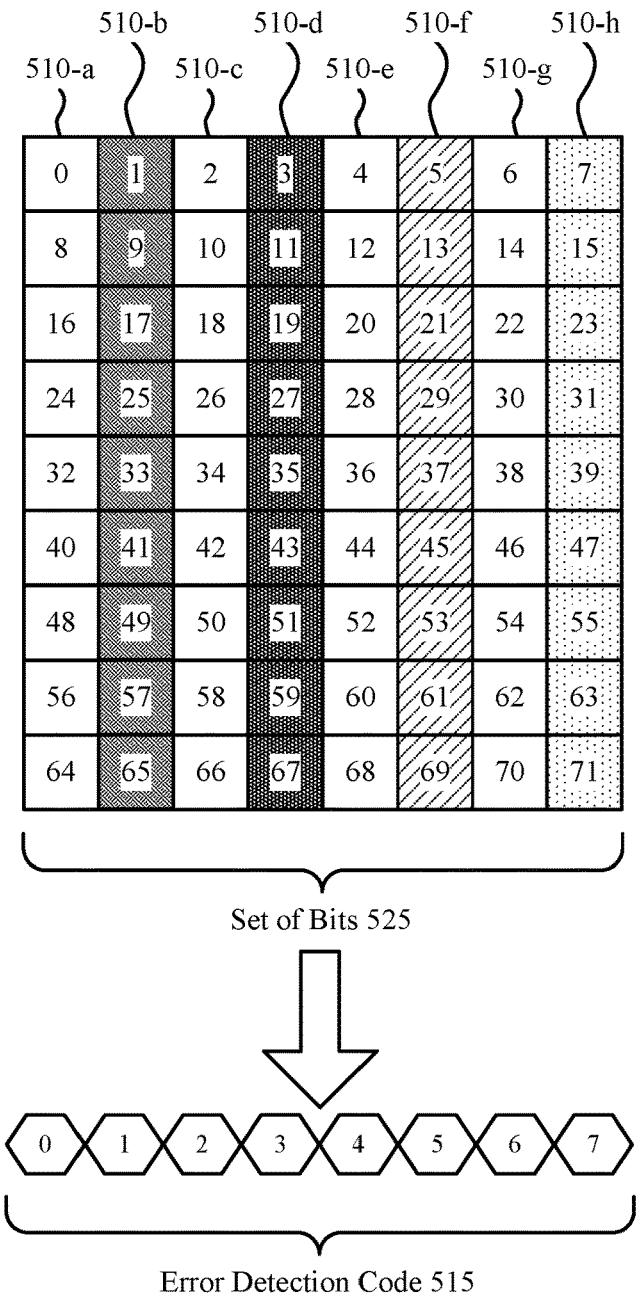

FIG. 5 illustrates a bit transmission 500 that supports error detection code generation techniques in accordance with examples as disclosed herein. The bit transmission 500 may illustrate bits transmitted from a memory device (e.g., the memory device 110, the memory die 200 described with reference to FIGS. 1 and 2) to a host device (e.g., the host device 105 as described with reference to FIG. 1). The bit transmission 500 may include aspects of bit transmissions 300 and 400 as described with reference to FIGS. 3 and 4, respectively. For example, the set of bits 525 may be an example of the set of bits 325 or 425, and the error detection code 515 may be an example of the error detection codes 315 or 415. The memory device may transmit the error detection codes 515 to the host device by an error detection code channel as described with reference to FIGS. 1 through 4.

The memory device may receive an access command from a host device and identify a first set of bits 525 based on the received access commands. For example, during the execution of a read command, the memory device may identify the bits 525 for transmission to the host device. Additionally, the memory device may calculate an error detection code 515 based on the identified set of bits 525. In some cases, each of the bits of the error detection code 515 may indicate a parity of a portion of the set of bits 525, where the portion of the set of bits associated with each bit of the error detection code 515 may be defined by a polynomial.

In some cases, the memory device may modify the set of bits 525 during an execution of the access operation. For example, the memory device may apply a modification function to the set of bits 525 to generate a modified set of bits 525. The modification function may be predefined or preconfigured. Additionally or alternatively, the modification function may be indicated to the memory device by the host device. In the example of bit transmission 500, the modification function may be based on inputs associated with the burst positions 510. Here, the modification function may dictate that each odd burst position (e.g., burst positions 510-*b*, 510-*d*, 510-*f*, or 510-*h*) may be inverted based on a flag or indicator bit associated with each burst position 510. For example, if a flag or indicator bit associated with burst position 510-*b* is a logic value '0', each odd bit associated with the burst position 510-*a* may be inverted. For example, bits 1, 9, 17, 25, 33, 41, 49, 57, and 65 may be inverted if the flag or indicator bit associated with burst position 510-*b* is a logic value '0'. In this example, the bits associated with the burst position 510 to be modified (e.g., in accordance with the modification function) may be inverted based on a logic function (e.g., an exclusive not-OR (XNOR) logic function) applied to the bits within that burst position 510 using the flag or indicator. For example, each odd bit associated with burst position 510-*d* may be XNORed with the indicator bit or flag associated with burst position 510-*d*. Thus, if the flag or indicator is a logic value '0', the bits may be inverted. Additionally, if the flag or indicator is a logic value '1', the bits may not be inverted. In some cases, the indicator bit or flag associated with each burst position 510 may be preconfigured or known by the memory device. Additionally or alternatively, the indicator bit or flag associated with each burst position 510 may be indicated to the memory device dynamically (e.g., by the host device).

The memory device may modify the error detection code 515 (e.g., calculated on the set of bits 525 prior to applying the modification function) based on the modifications applied to the set of bits 525. The memory device may modify the error detection code 515 based on a parity of the bits within the set of bits 525 that are modified to generate the modified sets of bits 525. That is, each bit of the error detection code 515 may be calculated based on a parity of a predefined portion of the set of bits 525 (e.g., predefined by a polynomial). The memory device may determine, for each bit of the error detection code 515, a parity of bits within the predefined portion of the set of bits 525 that are to be inverted based on the modification function. If the parity of the bits within the portion of the set of bits 525 that are modified to generate the modified data is even, the memory device may maintain a logic value of the corresponding bit within the error detection code 515. Alternatively, if the parity of the bits within the portion of the bits that are modified to generate the modified data is odd, the memory device may invert a logic value of the corresponding bit within the error detection code 515. The examples shown in FIGS. 4 and 5 of data modification based on modification functions are shown for illustration purposes and additional data modifications are considered. For example, any combination of data modification of burst positions or DQ pins based on modification indicators is contemplated, with a variety or combination of logic functions (e.g., XOR, XNOR).

Figure 6:
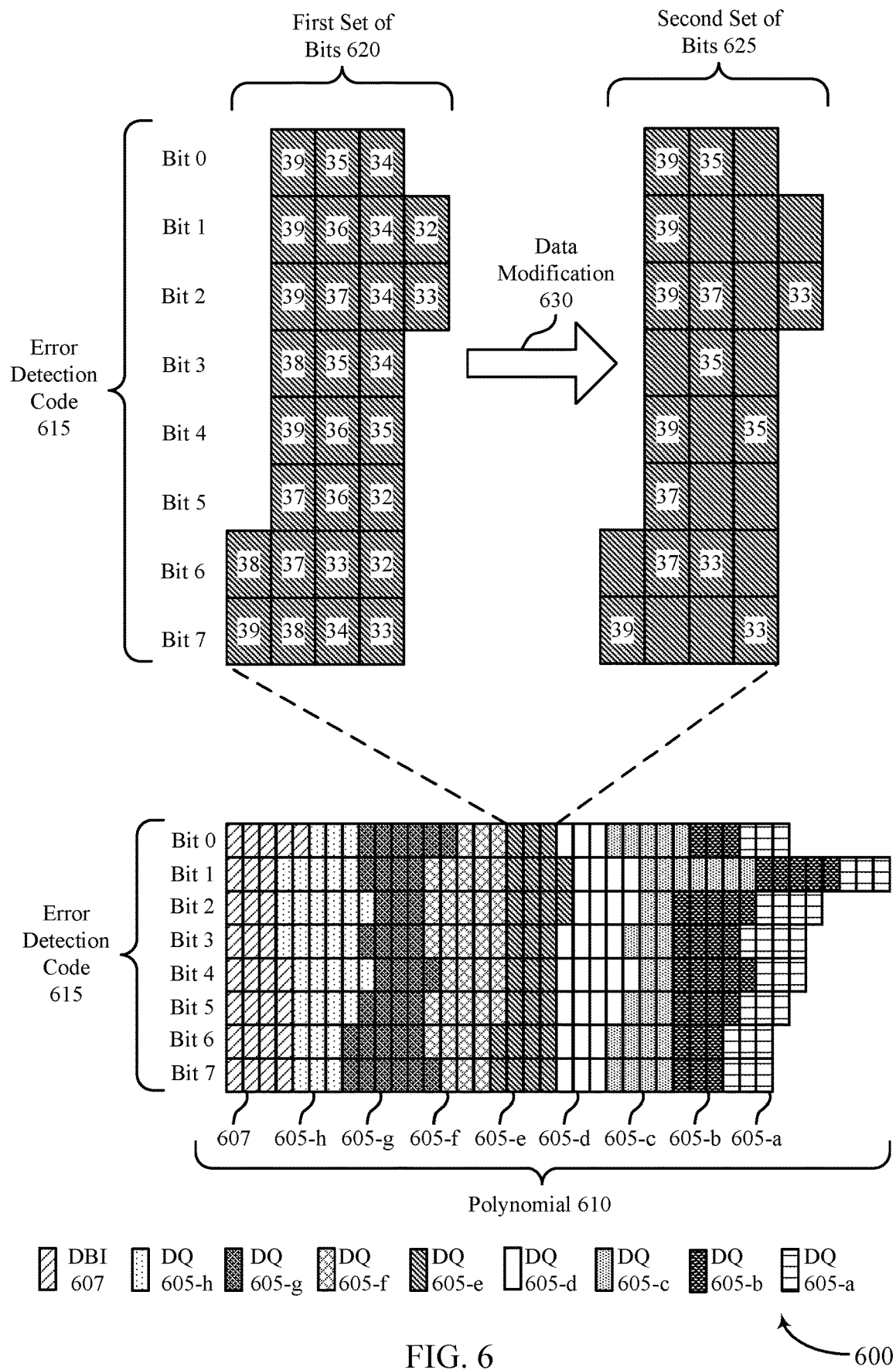
FIG. 6 illustrates an example of a data modification configuration that supports error detection code generation techniques in accordance with examples as disclosed herein.

FIG. 6 illustrates an example data modification configuration 600 that supports error detection code generation techniques in accordance with examples as disclosed herein. The data modification configuration 600 may include aspects of systems, memory dies, and bit transmissions as described with reference to FIGS. 1 through 5. For example, the polynomial 610 may be applied to a set of bits as described with reference to FIGS. 3 through 5. Additionally, the error detection code 615 may be an example of error detection codes as described with reference to FIGS. 3 through 5. The data modification configuration 600 may illustrate the polynomial 610 used to determine the error detection code 615 associated with a set of bits. The polynomial 610 may include bits from the set of bits associated with each of the DQ pins 605 and DBI pin 607. The memory device may perform a data modification 630 on a first set of bits 620 to generate a second set of bits 625 and the memory device may modify the error detection code 615 based on the data modification 630.

The memory device may generate a polynomial 610 including a set of bits to calculate an error detection code 615 associated with the set of bits (e.g., including the first set of bits 620) identified based on receiving an access command. That is, each bit within the error detection code 615 may indicate a parity of each bit within a same row of the polynomial 610. In some cases, each row of the polynomial 610 may correspond to a portion of the entire set of bits. For example, bit 0 of the error detection code 615 may indicate a parity of the bits within the first row of the polynomial 610 and bit 1 of the error detection code 615 may indicate a parity of the bits within the second row of the polynomial 610. Each of the bits within the polynomial may be associated with a DQ pin 605 or the DBI pin 407.

The memory device may perform a data modification 630 to generate a second set of bits including the second set of bits 625. Although data modification 630 is shown with respect to a data modification 630 applied to the data associated DQ pin 605-*e*, a similar data modification 630 may be performed to the data associated with each DQ pin 605 and the DBI pin 607. The data modification 630 may be based on a modification function that is preconfigured or predefined and one or more inputs (e.g., associated with the DQ pins 405, the burst position of the data). Here, the data modification 630 may be based on DQ pin 405 inputs and may be applied to each odd bit within the set of bits (e.g., as illustrated with reference to FIG. 4).

The memory device may calculate the error detection code 615 on the data (e.g., based on the polynomial 610) prior to generating the modified data including the second set of bits 625. Thus, the memory device may update the error detection code 615 based on the data modification 630. Here, the data modification 630 may be applied to the odd numbered bits and based on an input associated with DQ pins 405 and DBI pin 407. The memory device may determine to modify the error detection code 615 based on a parity of the bits that are modified during the data modification 630. The memory device may determine a possible quantity of bits that may be inverted during the data modification 630 (e.g., depending on a value of the flag or indicator). The memory device may determine the possible quantity of bits that may be inverted within a subset of the set of bits based on the modification function. That is, if the modification function is based on an input associated with a burst position, the memory device may determine the possible quantity of bits that may be inverted within a subset of bits each associated with a same burst position. Here, the data modification may be based on an input associated with the DQ pins 405 and the DBI pin 407. Thus, the memory device may determine a possible quantity of bits that may be inverted within each subset of bits associated with a same DQ pin 405 and the DBI pin 407.

The first set of bits 620 illustrates each of the bits within the polynomial 610 and the second set of bits 625 illustrates the possibly inverted bits (e.g., according to the data modification function). For example, the memory device may identify the bits within the subset of data associated with DQ pin 605-e (e.g., the first set of bits 620) that may be inverted during the data modification 630. For bit 0 of the error detection code 615, the memory device may identify that bits 39 and 35 may be inverted because they are odd. That is, the memory device may determine that bit 34 of the first set of bits 620 may not be inverted during the data modification 630 regardless of the input associated with the DQ pin 605-e because bit 34 is an even bit. In this example, the memory device may determine that two bits associated with bit 0 of the error detection code 615 may be inverted, one bit associated with bit 1 of the error detection code 615 may be inverted, and three bits associated with bit 2 of the error detection code 615 may be inverted.

The memory device may determine which subsets of data includes a possible number of odd inverted bits. That is, the memory device may determine to ignore subsets of data that include an even number of possibly inverted bits as an even number of bit inversions may not affect a parity associated with those bits. In the example of data modification configuration 600, the memory device may identify that the subset of bits associated with bit 0, bit 4, bit 6, and bit 7 of the error detection code 615 include an even quantity of bits that may be inverted. Additionally, the memory device may identify that the subset of bits associated with bit 1, bit 2, bit 3, and bit 5 of the error detection code include an odd quantity of bits that may be inverted.

The memory device may determine which subsets of data include a number of odd possibly inverted bits based on the modification function. That is, the memory device may determine which subsets of data include the number of possibly inverted bits independently of performing the data modification. Thus, the memory device may determine which subsets of data include a number of odd possibly inverted bits prior to (or in parallel with) performing the data modification operation. In some cases, the memory device may configure circuitry (e.g., programmable logic or registers controlling configurable logic) to determine which subsets of data include the number of odd possibly inverted bits based on the modification function.

The memory device may perform a logic function based on the identified subsets including an odd quantity of possibly inverted bits. That is, the memory device may include subsets associated with an odd quantity of possibly inverted bits and disregard subsets associated with an even quantity of bits. For example, the memory device may perform a logic function for each of the bits of the error detection code. In the example of data modification configuration 600, the memory device may perform, for each bit of the error detection code 615, a logic function (e.g., an XOR function, an XNOR function) using each of the flags or indicators associated with the DQ pins 605 or the DBI pin 607 associated with an odd quantity of possibly inverted bits. For example, the memory device may determine that, for bit 0 of the error detection code 615, the bits associated with DQ pin 605-h, DQ pin 605-d, DQ pin 605-c, and DQ pin 605-a may be associated with an odd quantity of possibly inverted bits. The memory device may subsequently perform the logic function (e.g., an XNOR function, an XOR function) of the indicators associated with DQ pins 605-h, DQ pin 605-d, DQ pin 605-c, and DQ pin 605-a to determine a parity bit associated with bit 0 of the error detection code 615. Thus, the memory device may determine, for each bit of the error detection code 615, a parity of the inverted bits (e.g., a parity vector including an entry associated with each bit of the error detection code 615). If the memory device uses preconfigured circuitry to determine which subsets of data include the odd number of possibly inverted bits, the memory device may input the indicators or flags to the preconfigured circuitry. Here, the circuitry may determine, based on the indicators or flags, the parity bits associated with the error detection code 615.

The memory device may then perform a logic function to determine the parity associated with the modified bit for each of the bits of the error detection code 615. For example, the memory device may perform a logic function (e.g., an XOR function, an XNOR function), for each bit of the error detection code 615, based on the originally calculated bit of the error detection code 615 and the determined parity of the inverted bits. Thus, the memory device may modify bits of the error detection code 615 based on the data modification 630 without recalculating the error detection code 615. Additionally, the memory device may modify the error detection code 615 in parallel (e.g., at a same time, prior to) to performing the data modification 630 to the data.

Figure 7:
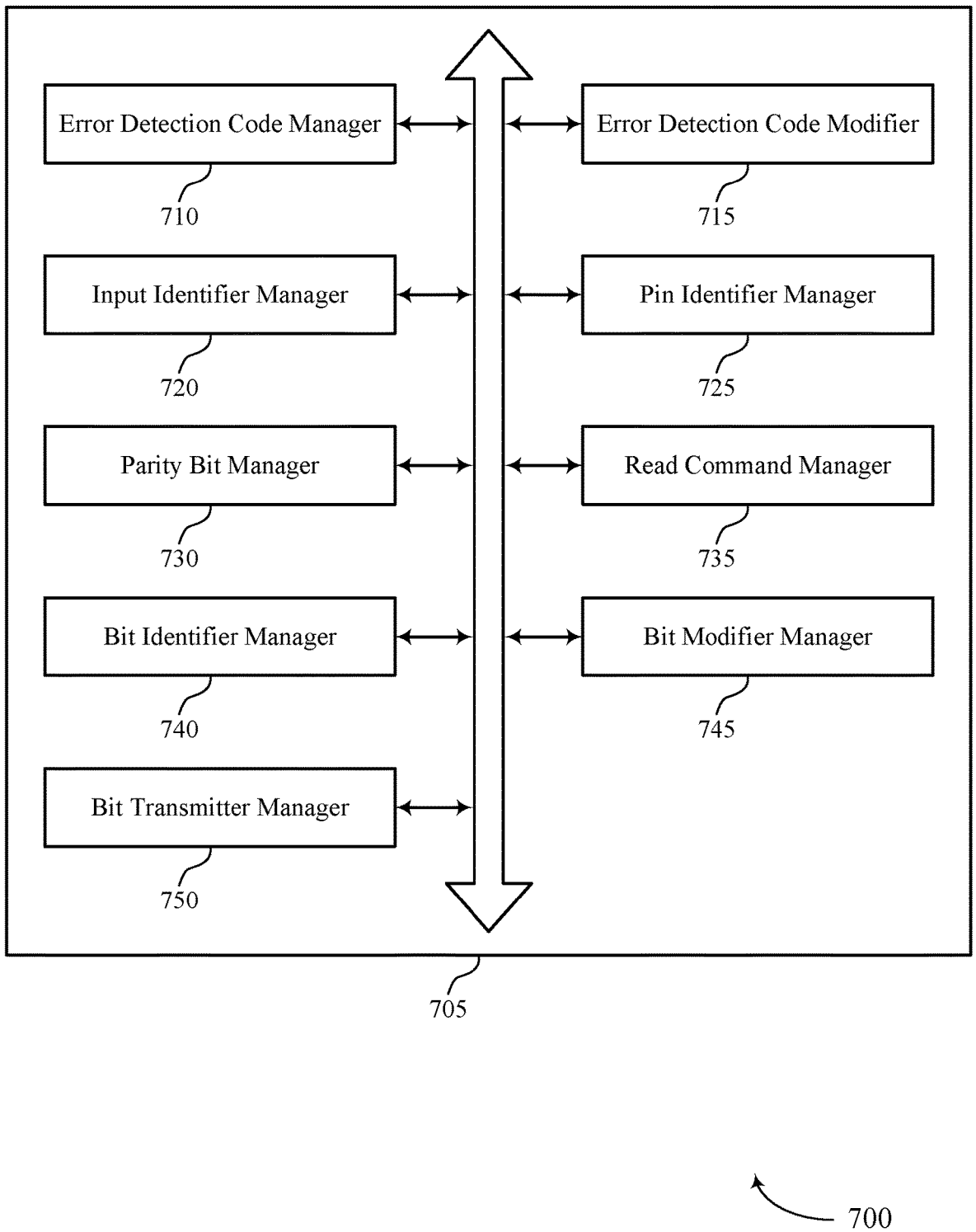
FIG. 7 shows a block diagram of a memory device that supports error detection code generation techniques in accordance with aspects of the present disclosure.

FIG. 7 shows a block diagram 700 of a memory device 705 that supports error detection code generation techniques in accordance with examples as disclosed herein. The memory device 705 may be an example of aspects of a memory device as described with reference to FIGS. 1-6. The memory device 705 may include an error detection code manager 710, an error detection code modifier 715, an input identifier manager 720, a pin identifier manager 725, a parity bit manager 730, a read command manager 735, a bit identifier manager 740, a bit modifier manager 745, and a bit transmitter manager 750. Each of these modules may communicate, directly or indirectly, with one another (e.g., via one or more buses).

The error detection code manager 710 may calculate a first error detection code associated with the first set of bits, the first error detection code for transmission from the memory device to the host device by a second channel. In some examples, the error detection code manager 710 may execute a first function to calculate a first error detection code associated with the first set of bits. In some cases, each bit within the first error detection code indicates a parity associated with a subset of the first set of bits for transmission. In some instances, each subset of the first set of bits includes at least one bit of the first set of bits associated with each pin of a set of pins within the first channel. In some examples, each bit within the first error detection code indicates a parity associated with a subset of the first set of bits for transmission.

The error detection code modifier 715 may modify one or more bits of the first error detection code to generate a second error detection code based on a parity of the modified one or more bits of the first set of bits. In some cases, the error detection code modifier 715 may identify, before a completion of executing the first function, a second function for modifying one or more bits of the first error detection code based on modifying the one or more bits of the first set of bits. In some instances, the error detection code modifier 715 may execute the second function to modify the first error detection code to obtain a second error detection code associated with the second set of bits. In some examples, the error detection code modifier 715 may identify the one or more bits of the first error detection code modified to generate the second error detection code based on a polarity of the parity bit associated with each subset of the first set of bits for transmission, where modifying the one or more bits of the first error detection code to generate the second error detection code is based on identifying the one or more bits of the first error detection code. In some cases, the error detection code modifier 715 may invert the one or more bits of the first error detection code to generate the second error detection code, where modifying the one or more bits of the first error detection code is based on inverting the one or more bits.

In some instances, the error detection code modifier 715 may identify one or more bits of the first error detection code to be modified during an execution of the second function based on a polarity of the parity bit associated with each subset of the first set of bits for transmission, where executing the second function is based on identifying the one or more bits of the first error detection code. In some examples, the error detection code modifier 715 may invert one or more bits of the first error detection code to generate the second error detection code, where executing the second function is based on inverting the one or more bits.

The input identifier manager 720 may identify one or more inputs for modifying the one or more bits of the first set of bits.

The pin identifier manager 725 may identify, for each subset of the first set of bits for transmission, a quantity of the set of pins associated with an odd number of bits modified to generate the second set of bits based on the one or more inputs. In some cases, the pin identifier manager 725 may identify the quantity of the set of pins before calculation of the first error detection code occurs. In some instances, the pin identifier manager 725 may identify, for each subset of the first set of bits for transmission, a quantity of the set of pins associated with an odd number of bits modified to generate the second set of bits.

The parity bit manager 730 may generate, for each subset of the first set of bits for transmission, a parity bit based on the quantity of the set of pins associated with the odd number of bits modified to generate the second set of bits, where modifying one or more bits of the first error detection code is based on generating the parity bit. In some examples, the parity bit manager 730 may generate, for each subset of the first set of bits for transmission, a parity bit based on the quantity of the set of pins associated with the odd number of bits modified to generate the second set of bits, where identifying the second function is based on generating the parity bit. In some cases, the parity bit manager 730 may generate the parity bits before the calculation of the first error detection code occurs.

The read command manager 735 may receive, from the host device, a read command indicating the first set of bits, where identifying the first set of bits is based on receiving the read command.

The bit identifier manager 740 may identify a first set of bits for transmission from a memory device to a host device by a first channel. In some examples, the bit identifier manager 740 may identify a first set of bits for transmission from a memory device to a host device by a first channel. In some cases, each subset of the first set of bits includes at least one bit of the first set of bits associated with each pin of a set of pins within the first channel.

The bit modifier manager 745 may modify one or more bits of the first set of bits to generate a second set of bits for transmission from the memory device to the host device by the first channel. In some instances, the bit modifier manager 745 may modify one or more bits of the first set of bits to generate a second set of bits for transmission from the memory device to the host device by the first channel. In some cases, the bit modifier manager 745 may invert the one or more bits of the first set of bits according to a function for modifying the first set of bits, where modifying the one or more bits of the first set of bits is based on inverting the one or more bits.

In some examples, the bit modifier manager 745 may invert the one or more of the first set of bits to generate the second set of bits, where modifying the one or more bits of the first set of bits is based on inverting the one or more bits. In some instances, the function for modifying the first set of bits is based on a distribution of the first set of bits across a set of pins within the first channel, a distribution of the first set of bits across a set of cycles of a burst for the first channel, a bit position of each bit within the first set of bits, or a combination thereof. In some cases, the function for modifying the first set of bits includes performing a logic function on the first set of bits.

The bit transmitter manager 750 may transmit, from the memory device to the host device, the second set of bits by the first channel and the second error detection code by the second channel. In some examples, the bit transmitter manager 750 may transmit, from the memory device to the host device, the second set of bits by the first channel and the second error detection code by a second channel.

Figure 8:
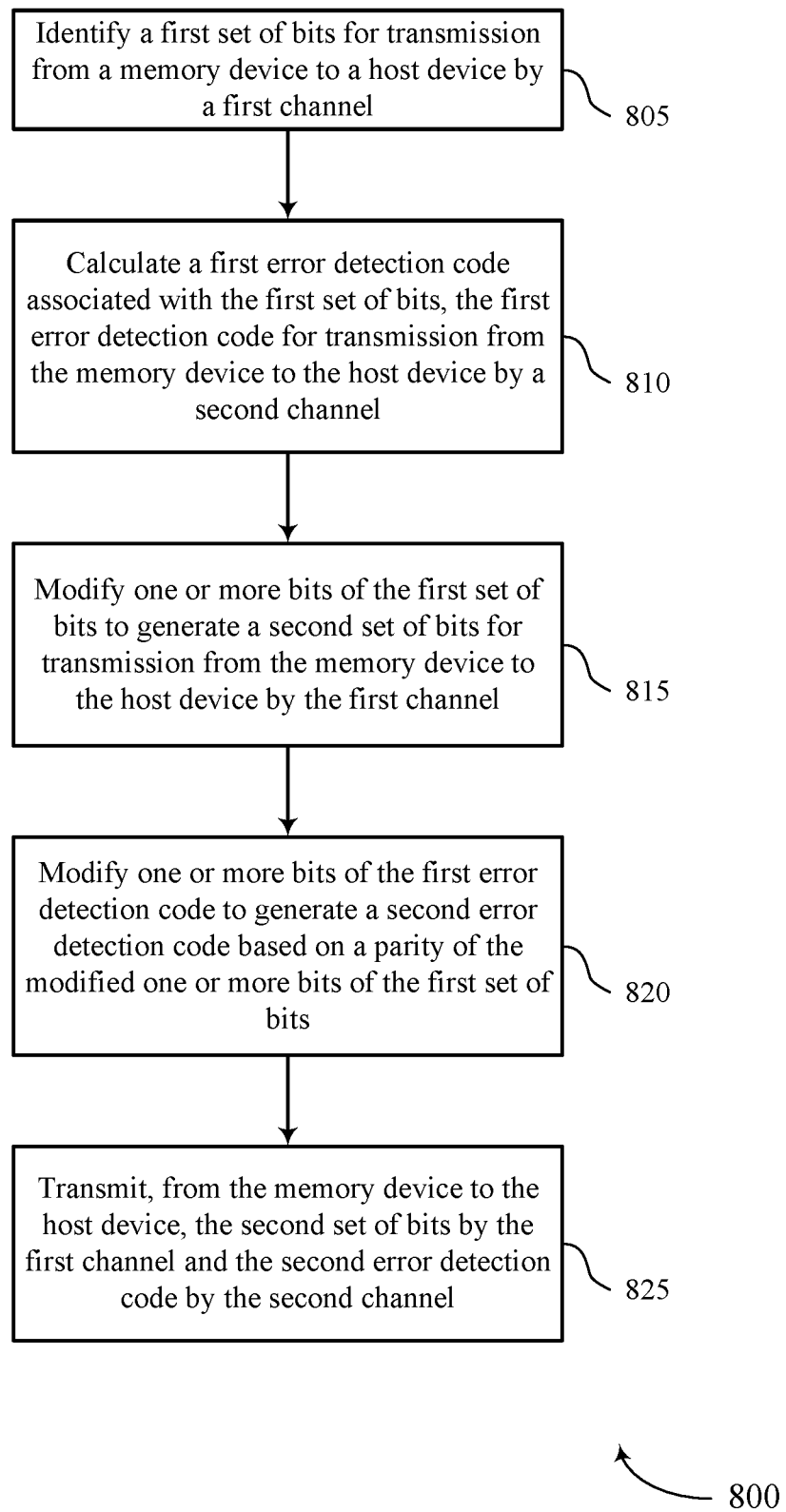
FIGS. 8 through 11 show flowcharts illustrating a method or methods that support error detection code generation techniques in accordance with examples as disclosed herein.

FIG. 8 shows a flowchart illustrating a method or methods 800 that supports error detection code generation techniques in accordance with aspects of the present disclosure. The operations of method 800 may be implemented by a memory device or its components as described herein. For example, the operations of method 800 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

At 805, the memory device may identify a first set of bits for transmission from a memory device to a host device by a first channel. The operations of 805 may be performed according to the methods described herein. In some examples, aspects of the operations of 805 may be performed by a bit identifier manager as described with reference to FIG. 7.

At 810, the memory device may calculate a first error detection code associated with the first set of bits, the first error detection code for transmission from the memory device to the host device by a second channel. The operations of 810 may be performed according to the methods described herein. In some examples, aspects of the operations of 810 may be performed by an error detection code manager as described with reference to FIG. 7.

At 815, the memory device may modify one or more bits of the first set of bits to generate a second set of bits for transmission from the memory device to the host device by the first channel. The operations of 815 may be performed according to the methods described herein. In some examples, aspects of the operations of 815 may be performed by a bit modifier manager as described with reference to FIG. 7.

At 820, the memory device may modify one or more bits of the first error detection code to generate a second error detection code based on a parity of the modified one or more bits of the first set of bits. The operations of 820 may be performed according to the methods described herein. In some examples, aspects of the operations of 820 may be performed by an error detection code modifier as described with reference to FIG. 7.

At 825, the memory device may transmit, from the memory device to the host device, the second set of bits by the first channel and the second error detection code by the second channel. The operations of 825 may be performed according to the methods described herein. In some examples, aspects of the operations of 825 may be performed by a bit transmitter manager as described with reference to FIG. 7.

In some examples, an apparatus as described herein may perform a method or methods, such as the method 800. The apparatus may include features, means, or instructions (e.g., a non-transitory computer-readable medium storing instructions executable by a processor) for identifying a first set of bits for transmission from a memory device to a host device by a first channel, calculating a first error detection code associated with the first set of bits, the first error detection code for transmission from the memory device to the host device by a second channel, modifying one or more bits of the first set of bits to generate a second set of bits for transmission from the memory device to the host device by the first channel, modifying one or more bits of the first error detection code to generate a second error detection code based on a parity of the modified one or more bits of the first set of bits, and transmitting, from the memory device to the host device, the second set of bits by the first channel and the second error detection code by the second channel.

In some cases of the method 800 and the apparatus described herein, each bit within the first error detection code indicates a parity associated with a subset of the first set of bits for transmission, and each subset of the first set of bits includes at least one bit of the first set of bits associated with each pin of a set of pins within the first channel.

Some instances of the method 800 and the apparatus described herein may further include operations, features, means, or instructions for identifying one or more inputs for modifying the one or more bits of the first set of bits, identifying, for each subset of the first set of bits for transmission, a quantity of the set of pins associated with an odd number of bits modified to generate the second set of bits based on the one or more inputs, and generating, for each subset of the first set of bits for transmission, a parity bit based on the quantity of the set of pins associated with the odd number of bits modified to generate the second set of bits, where modifying one or more bits of the first error detection code may be based on generating the parity bit.

Some examples of the method 800 and the apparatus described herein may further include operations, features, means, or instructions for identifying the one or more bits of the first error detection code modified to generate the second error detection code based on a polarity of the parity bit associated with each subset of the first set of bits for transmission, where modifying the one or more bits of the first error detection code to generate the second error detection code may be based on identifying the one or more bits of the first error detection code.

Some cases of the method 800 and the apparatus described herein may further include operations, features, means, or instructions for identifying the quantity of the set of pins or generating the parity bit occurs before calculating the first error detection code.

Some instances of the method 800 and the apparatus described herein may further include operations, features, means, or instructions for inverting the one or more bits of the first set of bits according to a function for modifying the first set of bits, where modifying the one or more bits of the first set of bits may be based on inverting the one or more bits.

In some examples of the method 800 and the apparatus described herein, the function for modifying the first set of bits may be based on a distribution of the first set of bits across a set of pins within the first channel, a distribution of the first set of bits across a set of cycles of a burst for the first channel, a bit position of each bit within the first set of bits, or a combination thereof.

In some cases of the method 800 and the apparatus described herein, the function for modifying the first set of bits includes performing a logic function on the first set of bits.

Some instances of the method 800 and the apparatus described herein may further include operations, features, means, or instructions for inverting the one or more bits of the first error detection code to generate the second error detection code, where modifying the one or more bits of the first error detection code may be based on inverting the one or more bits.

Some examples of the method 800 and the apparatus described herein may further include operations, features, means, or instructions for receiving, from the host device, a read command indicating the first set of bits, where identifying the first set of bits may be based on receiving the read command.

Figure 9:
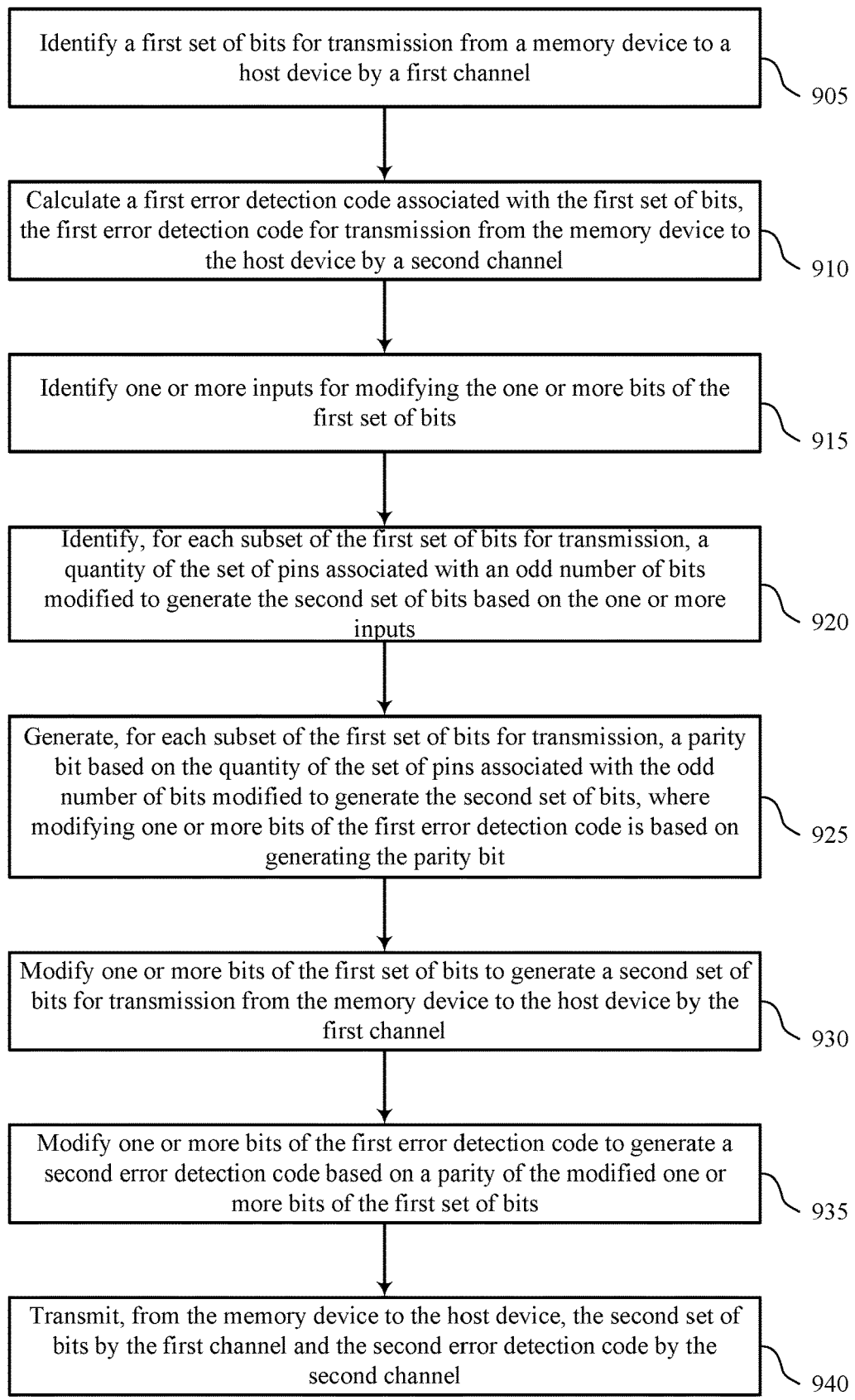

FIG. 9 shows a flowchart illustrating a method or methods 900 that supports error detection code generation techniques in accordance with aspects of the present disclosure. The operations of method 900 may be implemented by a memory device or its components as described herein. For example, the operations of method 900 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

At 905, the memory device may identify a first set of bits for transmission from a memory device to a host device by a first channel. The operations of 905 may be performed according to the methods described herein. In some examples, aspects of the operations of 905 may be performed by a bit identifier manager as described with reference to FIG. 7.

At 910, the memory device may calculate a first error detection code associated with the first set of bits, the first error detection code for transmission from the memory device to the host device by a second channel. The operations of 910 may be performed according to the methods described herein. In some examples, aspects of the operations of 910 may be performed by an error detection code manager as described with reference to FIG. 7.

At 915, the memory device may identify one or more inputs for modifying the one or more bits of the first set of bits. The operations of 915 may be performed according to the methods described herein. In some examples, aspects of the operations of 915 may be performed by an input identifier manager as described with reference to FIG. 7.

At 920, the memory device may identify, for each subset of the first set of bits for transmission, a quantity of the set of pins associated with an odd number of bits modified to generate the second set of bits based on the one or more inputs. The operations of 920 may be performed according to the methods described herein. In some examples, aspects of the operations of 920 may be performed by a pin identifier manager as described with reference to FIG. 7.

At 925, the memory device may generate, for each subset of the first set of bits for transmission, a parity bit based on the quantity of the set of pins associated with the odd number of bits modified to generate the second set of bits, where modifying one or more bits of the first error detection code is based on generating the parity bit. The operations of 925 may be performed according to the methods described herein. In some examples, aspects of the operations of 925 may be performed by a parity bit manager as described with reference to FIG. 7.

At 930, the memory device may modify one or more bits of the first set of bits to generate a second set of bits for transmission from the memory device to the host device by the first channel. The operations of 930 may be performed according to the methods described herein. In some examples, aspects of the operations of 930 may be performed by a bit modifier manager as described with reference to FIG. 7.

At 935, the memory device may modify one or more bits of the first error detection code to generate a second error detection code based on a parity of the modified one or more bits of the first set of bits. The operations of 935 may be performed according to the methods described herein. In some examples, aspects of the operations of 935 may be performed by an error detection code modifier as described with reference to FIG. 7.

At 940, the memory device may transmit, from the memory device to the host device, the second set of bits by the first channel and the second error detection code by the second channel. The operations of 940 may be performed according to the methods described herein. In some examples, aspects of the operations of 940 may be performed by a bit transmitter manager as described with reference to FIG. 7.

Figure 10:
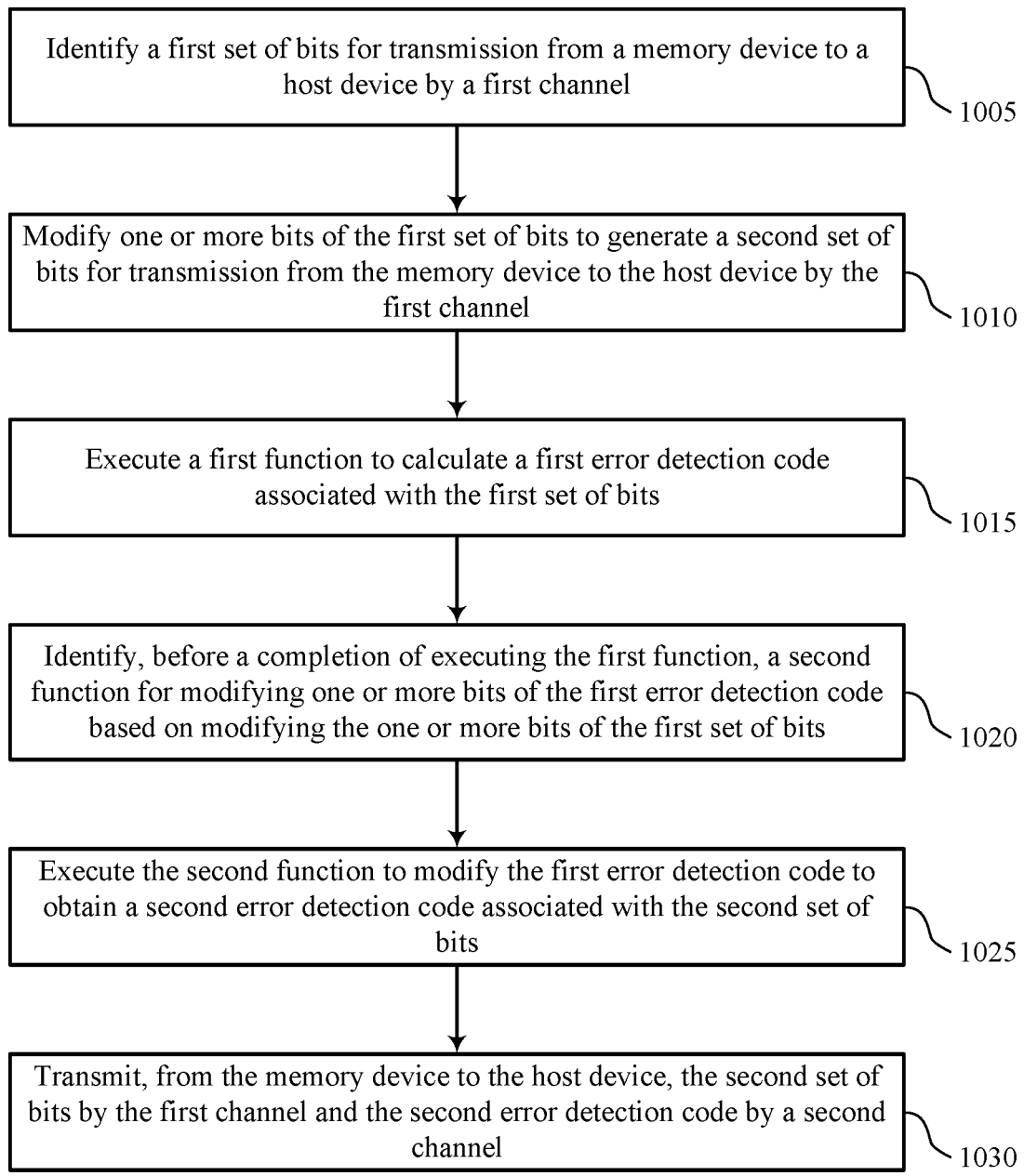

FIG. 10 shows a flowchart illustrating a method or methods 1000 that supports error detection code generation techniques in accordance with aspects of the present disclosure. The operations of method 1000 may be implemented by a memory device or its components as described herein. For example, the operations of method 1000 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

At 1005, the memory device may identify a first set of bits for transmission from a memory device to a host device by a first channel. The operations of 1005 may be performed according to the methods described herein. In some examples, aspects of the operations of 1005 may be performed by a bit identifier manager as described with reference to FIG. 7.

At 1010, the memory device may modify one or more bits of the first set of bits to generate a second set of bits for transmission from the memory device to the host device by the first channel. The operations of 1010 may be performed according to the methods described herein. In some examples, aspects of the operations of 1010 may be performed by a bit modifier manager as described with reference to FIG. 7.

At 1015, the memory device may execute a first function to calculate a first error detection code associated with the first set of bits. The operations of 1015 may be performed according to the methods described herein. In some examples, aspects of the operations of 1015 may be performed by an error detection code manager as described with reference to FIG. 7.

At 1020, the memory device may identify, before a completion of executing the first function, a second function for modifying one or more bits of the first error detection code based on modifying the one or more bits of the first set of bits. The operations of 1020 may be performed according to the methods described herein. In some examples, aspects of the operations of 1020 may be performed by an error detection code modifier as described with reference to FIG. 7.

At 1025, the memory device may execute the second function to modify the first error detection code to obtain a second error detection code associated with the second set of bits. The operations of 1025 may be performed according to the methods described herein. In some examples, aspects of the operations of 1025 may be performed by an error detection code modifier as described with reference to FIG. 7.

At 1030, the memory device may transmit, from the memory device to the host device, the second set of bits by the first channel and the second error detection code by a second channel. The operations of 1030 may be performed according to the methods described herein. In some examples, aspects of the operations of 1030 may be performed by a bit transmitter manager as described with reference to FIG. 7.

In some examples, an apparatus as described herein may perform a method or methods, such as the method 1000. The apparatus may include features, means, or instructions (e.g., a non-transitory computer-readable medium storing instructions executable by a processor) for identifying a first set of bits for transmission from a memory device to a host device by a first channel, and modifying one or more bits of the first set of bits to generate a second set of bits for transmission from the memory device to the host device by the first channel. The apparatus may further include features, means, or instructions for executing a first function to calculate a first error detection code associated with the first set of bits, identifying, before a completion of executing the first function, a second function for modifying one or more bits of the first error detection code based on modifying the one or more bits of the first set of bits, executing the second function to modify the first error detection code to obtain a second error detection code associated with the second set of bits, and transmitting, from the memory device to the host device, the second set of bits by the first channel and the second error detection code by a second channel.

In some examples of the method 1000 and the apparatus described herein, each bit within the first error detection code indicates a parity associated with a subset of the first set of bits for transmission, and each subset of the first set of bits includes at least one bit of the first set of bits associated with each pin of a set of pins within the first channel.

Some cases of the method 1000 and the apparatus described herein may further include operations, features, means, or instructions for identifying, for each subset of the first set of bits for transmission, a quantity of the set of pins associated with an odd number of bits modified to generate the second set of bits, and generating, for each subset of the first set of bits for transmission, a parity bit based on the quantity of the set of pins associated with the odd number of bits modified to generate the second set of bits, where identifying the second function may be based on generating the parity bit.

Some instances of the method 1000 and the apparatus described herein may further include operations, features, means, or instructions for identifying one or more bits of the first error detection code to be modified during an execution of the second function based on a polarity of the parity bit associated with each subset of the first set of bits for transmission, where executing the second function may be based on identifying the one or more bits of the first error detection code.

Some examples of the method 1000 and the apparatus described herein may further include operations, features, means, or instructions for inverting one or more bits of the first error detection code to generate the second error detection code, where executing the second function may be based on inverting the one or more bits.

Some cases of the method 1000 and the apparatus described herein may further include operations, features, means, or instructions for inverting the one or more of the first set of bits to generate the second set of bits, where modifying the one or more bits of the first set of bits may be based on inverting the one or more bits.

Figure 11:
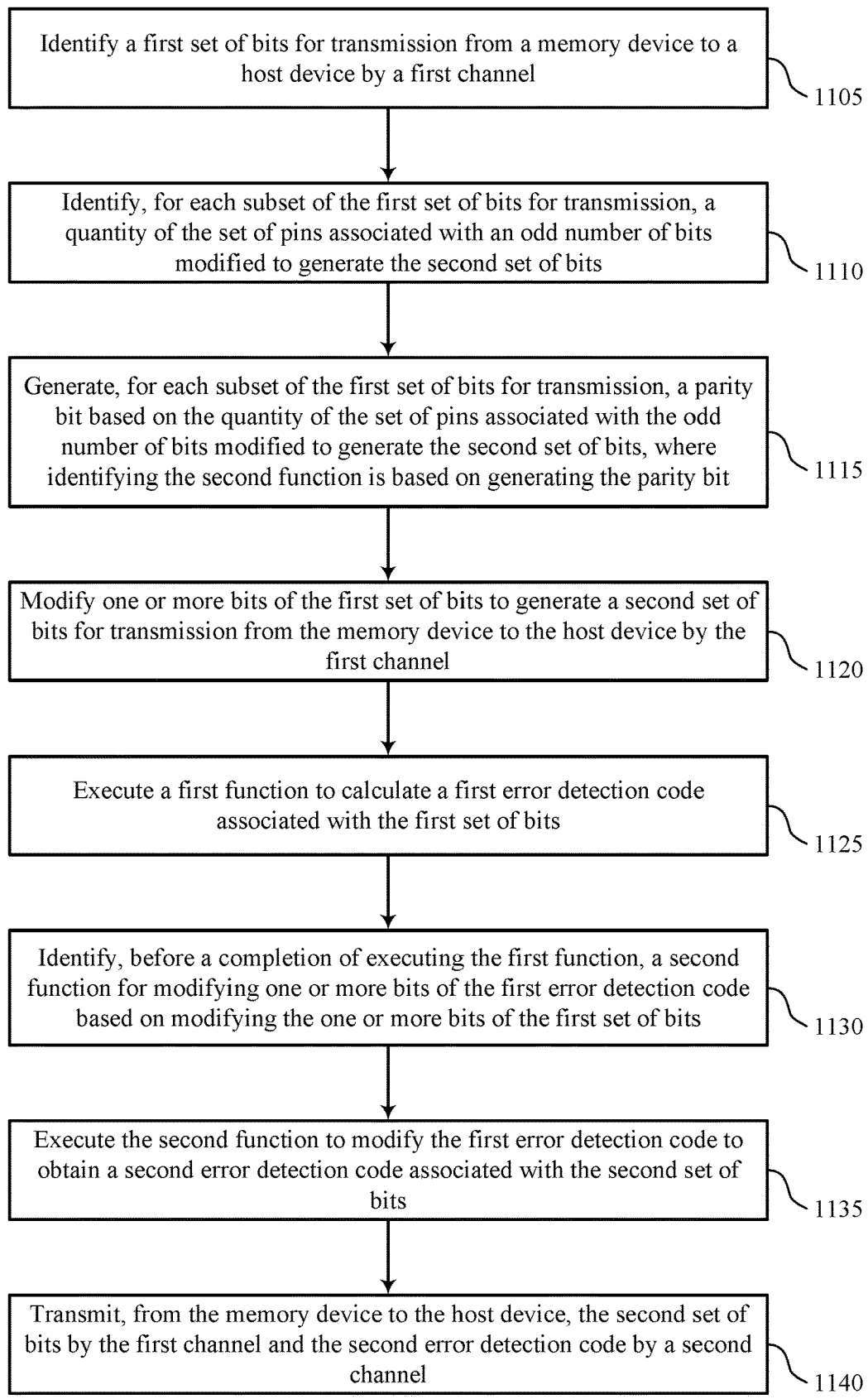

FIG. 11 shows a flowchart illustrating a method or methods 1100 that supports error detection code generation techniques in accordance with aspects of the present disclosure. The operations of method 1100 may be implemented by a memory device or its components as described herein. For example, the operations of method 1100 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

At 1105, the memory device may identify a first set of bits for transmission from a memory device to a host device by a first channel. The operations of 1105 may be performed according to the methods described herein. In some examples, aspects of the operations of 1105 may be performed by a bit identifier manager as described with reference to FIG. 7.

At 1110, the memory device may identify, for each subset of the first set of bits for transmission, a quantity of the set of pins associated with an odd number of bits modified to generate the second set of bits. The operations of 1110 may be performed according to the methods described herein. In some examples, aspects of the operations of 1110 may be performed by a pin identifier manager as described with reference to FIG. 7.

At 1115, the memory device may generate, for each subset of the first set of bits for transmission, a parity bit based on the quantity of the set of pins associated with the odd number of bits modified to generate the second set of bits, where identifying the second function is based on generating the parity bit. The operations of 1115 may be performed according to the methods described herein. In some examples, aspects of the operations of 1115 may be performed by a parity bit manager as described with reference to FIG. 7.

At 1120, the memory device may modify one or more bits of the first set of bits to generate a second set of bits for transmission from the memory device to the host device by the first channel. The operations of 1120 may be performed according to the methods described herein. In some examples, aspects of the operations of 1120 may be performed by a bit modifier manager as described with reference to FIG. 7.

At 1125, the memory device may execute a first function to calculate a first error detection code associated with the first set of bits. The operations of 1125 may be performed according to the methods described herein. In some examples, aspects of the operations of 1125 may be performed by an error detection code manager as described with reference to FIG. 7.

At 1130, the memory device may identify, before a completion of executing the first function, a second function for modifying one or more bits of the first error detection code based on modifying the one or more bits of the first set of bits. The operations of 1130 may be performed according to the methods described herein. In some examples, aspects of the operations of 1130 may be performed by an error detection code modifier as described with reference to FIG. 7.

At 1135, the memory device may execute the second function to modify the first error detection code to obtain a second error detection code associated with the second set of bits. The operations of 1135 may be performed according to the methods described herein. In some examples, aspects of the operations of 1135 may be performed by an error detection code modifier as described with reference to FIG. 7.

At 1140, the memory device may transmit, from the memory device to the host device, the second set of bits by the first channel and the second error detection code by a second channel. The operations of 1140 may be performed according to the methods described herein. In some examples, aspects of the operations of 1140 may be performed by a bit transmitter manager as described with reference to FIG. 7.

It should be noted that the methods described herein are possible implementations, and that the operations and the steps may be rearranged or otherwise modified and that other implementations are possible. Furthermore, portions from two or more of the methods may be combined.

An apparatus is described. The apparatus may include a circuitry configured to identify a first set of bits for transmission from the apparatus to a host device by a first channel, modify one or more bits of the first set of bits to generate a second set of bits for transmission from the apparatus to the host device by the first channel, calculate a first error detection code associated with the first set of bits, the first error detection code for transmission from the apparatus to the host device by a second channel, and modify one or more bits of the first error detection code to generate a second error detection code based on a parity of the modified one or more bits of the first set of bits. The apparatus may further include a transmitter coupled with the circuitry and configured to transmit, from the apparatus to the host device, the second set of bits by the first channel and the second error detection code by the second channel.

In some examples, each bit within the first error detection code indicates a parity associated with a subset of the first set of bits for transmission, and each subset of the first set of bits includes at least one bit of the first set of bits associated with each input of a set of inputs for modifying the one or more bits of the first set of bits.

In some cases, the circuitry may be further configured to identify, for each subset of the first set of bits for transmission, a quantity of the set of inputs associated with an odd number of bits modified to generate the second set of bits, and generate, for each subset of the first set of bits for transmission, a parity bit based on the quantity of the set of inputs associated with the odd number of bits modified to generate the second set of bits, where modifying one or more bits of the first error detection code may be based on generating the parity bit.

In some instances, the circuitry may be further operable to identify the one or more bits of the first error detection code modified to generate the second error detection code based on a polarity of the parity bit associated with each subset of the first set of bits for transmission, where modifying the one or more bits of the first error detection code to generate the second error detection code may be based on identifying the one or more bits of the first error detection code.

In some examples, identifying the quantity of the set of inputs or generating the parity bit occurs before calculating the first error detection code.

In some cases, the circuitry may be further configured to invert the one or more bits of the first set of bits according to a function for modifying the first set of bits, where modifying the one or more bits of the first set of bits may be based on inverting the one or more bits.

In some instances, the circuitry may be further configured to invert the one or more bits of the first error detection code to generate the second error detection code, where modifying the one or more bits of the first error detection code may be based on inverting the one or more bits.

In some examples, the apparatus further includes an interface coupled with the host device and the circuitry and configured to receive, from the host device, a read command indicating the first set of bits, where identifying the first set of bits may be based on receiving the read command.

An apparatus is described. The apparatus may include a circuitry configured to identify a first set of bits for transmission from the apparatus to a host device by a first channel, modify one or more bits of the first set of bits to generate a second set of bits for transmission from the apparatus to the host device by the first channel, execute a first function to calculate a first error detection code associated with the first set of bits, identify, before a completion of executing the first function, a second function for modifying one or more bits of the first error detection code based on modifying the one or more bits of the first set of bits, and execute the second function to modify the first error detection code and generate a second error detection code associated with the second set of bits. The apparatus may further include a transmitter coupled with the circuitry and configured to transmit, from the apparatus to the host device, the second set of bits and the second error detection code.

In some examples, each bit within the first error detection code indicates a parity associated with a subset of the first set of bits for transmission, and each subset of the first set of bits includes at least one bit of the first set of bits associated with each pin of a set of pins within the first channel.

In some cases, the circuitry may be further operable to identify, for each subset of the first set of bits for transmission, a quantity of the set of pins associated with an odd number of bits modified to generate the second set of bits, and generate, for each subset of the first set of bits for transmission, a parity bit based on the quantity of the set of pins associated with the odd number of bits modified to generate the second set of bits, where identifying the second function may be based on generating the parity bit.

In some instances, the circuitry may be further configured to identify one or more bits of the first error detection code to be modified during an execution of the second function based on a polarity of the parity bit associated with each subset of the first set of bits for transmission, where executing the second function may be based on identifying the one or more bits of the first error detection code.

In some examples, the circuitry may be further configured to invert one or more bits of the first error detection code to generate the second error detection code, where executing the second function may be based on inverting the one or more bits.

In some cases, the circuitry may be further configured to invert the one or more of the first set of bits to generate the second set of bits, where modifying the one or more bits of the first set of bits may be based on inverting the one or more bits.

An apparatus is described. The apparatus may include an array of memory cells, first circuitry coupled with the array of memory cells and configured to receive, from the array of memory cells, a first set of bits for transmission from the apparatus to a host device by a first channel, second circuitry coupled with the first circuitry and configured to calculate a first error detection code associated with the first set of bits, the first error detection code for transmission from the apparatus to the host device by a second channel, third circuitry coupled with the first circuitry and the second circuitry and configured to receive, from the first circuitry, the first set of bits, and modify one or more bits of the first set of bits to generate a second set of bits for transmission from the apparatus to the host device by the first channel, fourth circuitry coupled with the second circuitry and the third circuitry and configured to modify one or more bits of the first error detection code to generate a second error detection code based on a parity of the modified one or more bits of the first set of bits, and a transmitter coupled with the third circuitry and the fourth circuitry and configured to transmit, from the apparatus to the host device, the second set of bits by the first channel and the second error detection code by the second channel.

In some examples, each bit within the first error detection code indicates a parity associated with a subset of the first set of bits for transmission, and each subset of the first set of bits includes at least one bit of the first set of bits associated with each pin of a set of pins within the first channel.

In some cases, the fourth circuitry may be further configured to identify, for each subset of the first set of bits for transmission, a quantity of the set of pins associated with an odd number of bits modified to generate the second set of bits, and generate for each subset of the first set of bits for transmission, a parity bit based on the quantity of the set of pins associated with the odd number of bits modified to generate the second set of bits, where modifying one or more bits of the first error detection code may be based on generating the parity bit.

In some examples, the fourth circuitry may be further configured to identify the one or more bits of the first error detection code modified to generate the second error detection code based on a polarity of the parity bit associated with each subset of the first set of bits for transmission, where modifying the one or more bits of the first error detection code to generate the second error detection code may be based on identifying the one or more bits of the first error detection code.

Some examples may further include identifying the quantity of the set of pins or generating the parity bit occurs before calculating the first error detection code.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals can be communicated between components over the conductive path. When a component, such as a controller, couples other components together, the component initiates a change that allows signals to flow between the other components over a conductive path that previously did not permit signals to flow.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
calculating, by a memory device, a first error detection code associated with a first set of bits;
modifying one or more bits of the first set of bits to generate a second set of bits for transmission from the memory device to a host device;
modifying one or more bits of the first error detection code to generate a second error detection code based at least in part on a parity of the modified one or more bits of the first set of bits; and
transmitting, from the memory device to the host device, the second set of bits and the second error detection code.

2. The method of claim 1, wherein:
each bit within the first error detection code indicates a parity associated with a subset of the first set of bits; and
each subset of the first set of bits comprises at least one bit of the first set of bits associated with each pin of a plurality of pins.

3. The method of claim 2, further comprising:
identifying, for each subset of the first set of bits, a quantity of the plurality of pins associated with an odd number of bits modified to generate the second set of bits based at least in part on one or more inputs; and
generating, for each subset of the first set of bits, a parity bit based at least in part on the quantity of the plurality of pins associated with the odd number of bits modified to generate the second set of bits.

4. The method of claim 3, further comprising:
identifying the one or more bits of the first error detection code modified to generate the second error detection code based at least in part on a polarity of the parity bit associated with each subset of the first set of bits for transmission.

5. The method of claim 3, wherein:
calculating the first error detection code is based at least in part on identifying the quantity of the plurality of pins.

6. The method of claim 1, further comprising:
inverting the one or more bits of the first set of bits according to a function for modifying the first set of bits based at least in part on calculating the first error detection code.

7. The method of claim 6, wherein the function for modifying the first set of bits is based at least in part on a distribution of the first set of bits across a plurality of pins within a second channel, a distribution of the first set of bits across a plurality of cycles of a burst for a second channel, a bit position of each bit within the first set of bits, or a combination thereof.

8. The method of claim 1, further comprising:
inverting the one or more bits of the first error detection code to generate the second error detection code based at least in part on calculating the first error detection code.

9. The method of claim 1, further comprising:
receiving, from the host device, a read command indicating the first set of bits, wherein calculating the first error detection code is based at least in part on receiving the read command.

10. An apparatus, comprising:
a controller operable to cause the apparatus to:
calculate a first error detection code associated with a first set of bits;
modify one or more bits of the first set of bits to generate a second set of bits for transmission to a host device; and
modify one or more bits of the first error detection code to generate a second error detection code based at least in part on a parity of the modified one or more bits of the first set of bits; and
a transmitter coupled with the controller, wherein the transmitter is configured to:
transmit the second set of bits and the second error detection code to the host device.

11. The apparatus of claim 10, wherein:
each bit within the first error detection code indicates a parity associated with a subset of the first set of bits; and
each subset of the first set of bits comprises at least one bit of the first set of bits associated with each pin of a plurality of pins.

12. The apparatus of claim 11, wherein the controller is operable to cause the apparatus to:
identify, for each subset of the first set of bits, a quantity of the plurality of pins associated with an odd number of bits modified to generate the second set of bits based at least in part on one or more inputs; and
generate, for each subset of the first set of bits, a parity bit based at least in part on the quantity of the plurality of pins associated with the odd number of bits modified to generate the second set of bits.

13. The apparatus of claim 12, wherein the controller is operable to cause the apparatus to:
identify the one or more bits of the first error detection code modified to generate the second error detection code based at least in part on a polarity of the parity bit associated with each subset of the first set of bits for transmission.

14. The apparatus of claim 12, wherein:
calculating the first error detection code is based at least in part on identifying the quantity of the plurality of pins.

15. The apparatus of claim 10, wherein the controller is operable to cause the apparatus to:
invert the one or more bits of the first set of bits according to a function for modifying the first set of bits based at least in part on calculating the first error detection code.

16. The apparatus of claim 15, wherein the function for modifying the first set of bits is based at least in part on a distribution of the first set of bits across a plurality of pins within a second channel, a distribution of the first set of bits across a plurality of cycles of a burst for a second channel, a bit position of each bit within the first set of bits, or a combination thereof.

17. The apparatus of claim 10, wherein the controller is operable to cause the apparatus to:
invert the one or more bits of the first error detection code to generate the second error detection code based at least in part on calculating the first error detection code.

18. The apparatus of claim 10, wherein the controller is operable to cause the apparatus to:
receive, from the host device, a read command indicating the first set of bits, wherein calculating the first error detection code is based at least in part on receiving the read command.

19. An apparatus, comprising:
an array of memory cells,
first circuitry coupled with the array of memory cells and configured to calculate a first error detection code associated with a first set of bits;
second circuitry coupled with the first circuitry and the second circuitry and configured to:
  modify one or more bits of the first set of bits to generate a second set of bits for transmission to a host device;
third circuitry coupled with the first circuitry and the second circuitry and configured to modify one or more bits of the first error detection code to generate a second error detection code based at least in part on a parity of the modified one or more bits of the first set of bits; and
a transmitter coupled with the second circuitry and the third circuitry and configured to transmit, from the apparatus to the host device, the second set of bits and the second error detection code.

20. The apparatus of claim 19, wherein:
each bit within the first error detection code indicates a parity associated with a subset of the first set of bits; and
each subset of the first set of bits comprises at least one bit of the first set of bits associated with each pin of a plurality of pins.

* * * * *